United States Patent
Matos

(10) Patent No.: US 11,474,881 B1
(45) Date of Patent: Oct. 18, 2022

(54) OPTIMIZING DISTRIBUTED AND PARALLELIZED BATCH DATA PROCESSING

(71) Applicant: Bank of America Corporation, Charlotte, NC (US)

(72) Inventor: Marcus Matos, Richardson, TX (US)

(73) Assignee: Bank of America Corporation, Charlotte, NC (US)

(*) Notice: Subject to any disclaimer, the term of this patent is extended or adjusted under 35 U.S.C. 154(b) by 65 days.

(21) Appl. No.: 17/218,587

(22) Filed: Mar. 31, 2021

(51) Int. Cl.
*G06F 9/46* (2006.01)
*G06F 9/52* (2006.01)
*G06F 9/50* (2006.01)
*G06F 16/245* (2019.01)
*G06F 9/48* (2006.01)

(52) U.S. Cl.
CPC .......... *G06F 9/524* (2013.01); *G06F 9/4881* (2013.01); *G06F 9/505* (2013.01); *G06F 16/245* (2019.01)

(58) Field of Classification Search
CPC ...... G06F 9/524; G06F 16/245; G06F 9/4881; G06F 9/505
See application file for complete search history.

(56) References Cited

U.S. PATENT DOCUMENTS

| | | | |
|---|---|---|---|
| 5,625,832 A | 4/1997 | Ohsawa et al. | |
| 7,720,841 B2 | 5/2010 | Gu et al. | |
| 7,844,959 B2 | 11/2010 | Isard | |
| 3,069,190 A1 | 11/2011 | McColl et al. | |
| 8,219,848 B2 | 7/2012 | Branson et al. | |
| 8,683,471 B2 | 3/2014 | Brent et al. | |
| 10,331,380 B1 | 6/2019 | Florissi et al. | |
| 10,404,787 B1 | 9/2019 | Florissi et al. | |
| 2021/0092536 A1 | 3/2021 | Roeck et al. | |
| 2021/0092551 A1 | 3/2021 | Millington et al. | |
| 2021/0092555 A1 | 3/2021 | Mayor et al. | |
| 2021/0092557 A1 | 3/2021 | Buck, Jr. et al. | |
| 2021/0092562 A1 | 3/2021 | Markhovsky et al. | |
| 2021/0092567 A1 | 3/2021 | Jang et al. | |
| 2021/0092580 A1 | 3/2021 | Padgett et al. | |
| 2021/0092586 A1 | 3/2021 | Ahmadi et al. | |
| 2021/0092591 A1 | 3/2021 | Vallee et al. | |
| 2021/0092604 A1 | 3/2021 | Fox et al. | |
| 2021/0092605 A1 | 3/2021 | Draznin et al. | |
| 2021/0092610 A1 | 3/2021 | Viegas | |
| 2021/0092611 A1 | 3/2021 | Pasricha et al. | |
| 2021/0092613 A1 | 3/2021 | Palyutina et al. | |
| 2021/0092615 A1 | 3/2021 | Furuichi | |
| 2021/0092636 A1 | 3/2021 | Sharma et al. | |

(Continued)

*Primary Examiner* — Gregory A Kessler
(74) *Attorney, Agent, or Firm* — Banner & Witcott, Ltd.

(57) ABSTRACT

Aspects of the disclosure relate to providing and maintaining efficient and effective processing of sets of work items in enterprise computing environments by optimizing distributed and parallelized batch data processing. A computing platform may initialize at least two processing workers. Subsequently, the computing platform may cause a first processing worker to perform a first query on a work queue database and initiate parallel processing of a first set of work items. Thereafter, the computing platform may cause the second processing worker to perform a second query on the work queue database and initiate parallel processing of a second set of work items. In some instances, performing the second query on the work queue database comprises reading at least one work item that was read and locked by the first processing worker.

20 Claims, 8 Drawing Sheets

(56) References Cited

U.S. PATENT DOCUMENTS

| | | |
|---|---|---|
| 2021/0092660 A1 | 3/2021 | Cui |
| 2021/0092662 A1 | 3/2021 | Takahashi et al. |
| 2021/0092668 A1 | 3/2021 | Zaus et al. |
| 2021/0092671 A1 | 3/2021 | Manolakos et al. |
| 2021/0092703 A1 | 3/2021 | Min et al. |
| 2021/0092745 A1 | 3/2021 | Bellamkonda et al. |
| 2021/0092752 A1 | 3/2021 | Faneja et al. |
| 2021/0092773 A1 | 3/2021 | Chen et al. |
| 2021/0092781 A1 | 3/2021 | Lauridsen et al. |

OPTIMIZING DISTRIBUTED AND PARALLELIZED BATCH DATA PROCESSING

BACKGROUND

Aspects of the disclosure relate to data processing systems, database systems, and parallel processing. In particular, one or more aspects of the disclosure relate to providing and maintaining efficient and effective processing of sets of work items in enterprise computing environments by optimizing distributed and parallelized batch data processing.

Enterprise organizations may utilize various computing infrastructure to maintain confidential information and/or other sensitive data that is created and/or used for various purposes. Ensuring that this data is secure and processed efficiently may be critically important both to protecting the integrity and confidentiality of the underlying information and associated resources and to ensuring the stability and utility of enterprise computer systems. In many instances, however, it may be difficult to provide and maintain efficient and effective processing of sets of work items in enterprise computing environments, particularly when relatively large or variably-sized sets of work items are queued for processed.

SUMMARY

Aspects of the disclosure provide effective, efficient, scalable, and convenient technical solutions that address and overcome the technical problems associated with providing and maintaining efficient and effective processing of sets of work items in enterprise computing environments by optimizing distributed and parallelized batch data processing.

In accordance with one or more embodiments, a computing platform having at least one processor, a communication interface, and memory may initialize at least two processing workers, wherein initializing the at least two processing workers comprises initializing a first processing worker and a second processing worker. Subsequently, the computing platform may cause the first processing worker to perform a first query on a work queue database, wherein performing the first query on the work queue database comprises reading and locking a first set of work items identified in the work queue database. In addition, the computing platform may cause the first processing worker to initiate parallel processing of the first set of work items, wherein initiating parallel processing of the first set of work items comprises: processing a first subset of the first set of work items in parallel; and upon completion of processing each work item of the first subset of the first set of work items, marking the corresponding work item as completed in the work queue database. Thereafter, the computing platform may cause the second processing worker to perform a second query on the work queue database, wherein performing the second query on the work queue database comprises reading and locking a second set of work items identified in the work queue database. In addition, the computing platform may cause the second processing worker to initiate parallel processing of the second set of work items, wherein initiating parallel processing of the second set of work items comprises: processing a first subset of the second set of work items in parallel; and upon completion of processing each work item of the first subset of the second set of work items, marking the corresponding work item as completed in the work queue database.

In some embodiments, performing the first query on the work queue database comprises causing a database engine associated with the work queue database to lock the first set of work items upon read. In some embodiments, performing the first query on the work queue database comprises selecting the first set of work items based on one or more priority parameters.

In some embodiments, performing the first query on the work queue database comprises writing, in the work queue database, a first timestamp indicating when the first set of work items were read from the work queue database. In some embodiments, the first timestamp is tracked by a database engine associated with the work queue database to provide expired items to one or more other processing workers.

In some embodiments, performing the second query on the work queue database comprises reading at least one work item that was read and locked by the first processing worker.

In some embodiments, the computing platform may monitor a pending workload in the work queue database. Based on monitoring the pending workload in the work queue database, the computing platform may dynamically scale an availability level of processing workers.

In some embodiments, monitoring the pending workload in the work queue database comprises requesting one or more size values from the work queue database. In some embodiments, dynamically scaling the availability level of processing workers comprises initializing at least one additional processing worker. In some embodiments, dynamically scaling the availability level of processing workers comprises destroying at least one processing worker.

In some embodiments, the computing platform may cause a monitoring process to create one or more historical records. Subsequently, the computing platform may dynamically optimize one or more processing parameters based on the one or more historical records.

In accordance with one or more additional or alternative embodiments, a computing platform having at least one processor, a communication interface, and memory may initialize a monitoring process configured to monitor a pending workload in a work queue database. Subsequently, the computing platform may cause the monitoring process to query the work queue database and create one or more historical records indicative of a workload processing status associated with one or more processing workers, wherein the one or more processing workers are configured to process work items identified in the work queue database based on one or more processing parameters. Thereafter, the computing platform may identify one or more new parameter values for the one or more processing parameters associated with the one or more processing workers based on the one or more historical records. Then, the computing platform may configure the one or more processing workers based on the one or more new parameter values identified for the one or more processing parameters associated with the one or more processing workers.

In some embodiments, each processing worker of the one or more processing workers is configured to read a set of work items identified in the work queue database and process the set of work items in parallel. In some embodiments, each processing worker of the one or more processing workers is configured to write a timestamp into the work queue database upon reading the set of work items, the timestamp indicating when the set of work items were read from the work queue database. In some embodiments, each processing worker of the one or more processing workers is configured to lock the set of work items upon reading the set of work items.

In some embodiments, identifying the one or more new parameter values for the one or more processing parameters associated with the one or more processing workers may include: inputting, into at least one machine learning model, data selected from the one or more historical records; and receiving, from the machine learning model, the one or more new parameter values for the one or more processing parameters associated with the one or more processing workers.

In some embodiments, configuring the one or more processing workers comprises adjusting a number of work items requested by each processing worker of the one or more processing workers. In some embodiments, configuring the one or more processing workers comprises adjusting one or more priority settings used by each processing worker of the one or more processing workers. In some embodiments, configuring the one or more processing workers comprises adjusting one or more expiration time values of a database engine associated with the work queue database.

In some embodiments, the computing platform may initialize at least two processing workers, wherein initializing the at least two processing workers comprises initializing a first processing worker and a second processing worker. Subsequently, the computing platform may cause the first processing worker to perform a first query on the work queue database, wherein performing the first query on the work queue database comprises reading and locking a first set of work items identified in the work queue database. In addition, the computing platform may initiate parallel processing of the first set of work items, wherein initiating parallel processing of the first set of work items comprises: processing a first subset of the first set of work items in parallel; and upon completion of processing each work item of the first subset of the first set of work items, marking the corresponding work item as completed in the work queue database. Thereafter, the computing platform may cause the second processing worker to perform a second query on the work queue database, wherein performing the second query on the work queue database comprises reading and locking a second set of work items identified in the work queue database. In addition, the computing platform may initiate parallel processing of the second set of work items, wherein initiating parallel processing of the second set of work items comprises: processing a first subset of the second set of work items in parallel; and upon completion of processing each work item of the first subset of the second set of work items, marking the corresponding work item as completed in the work queue database.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
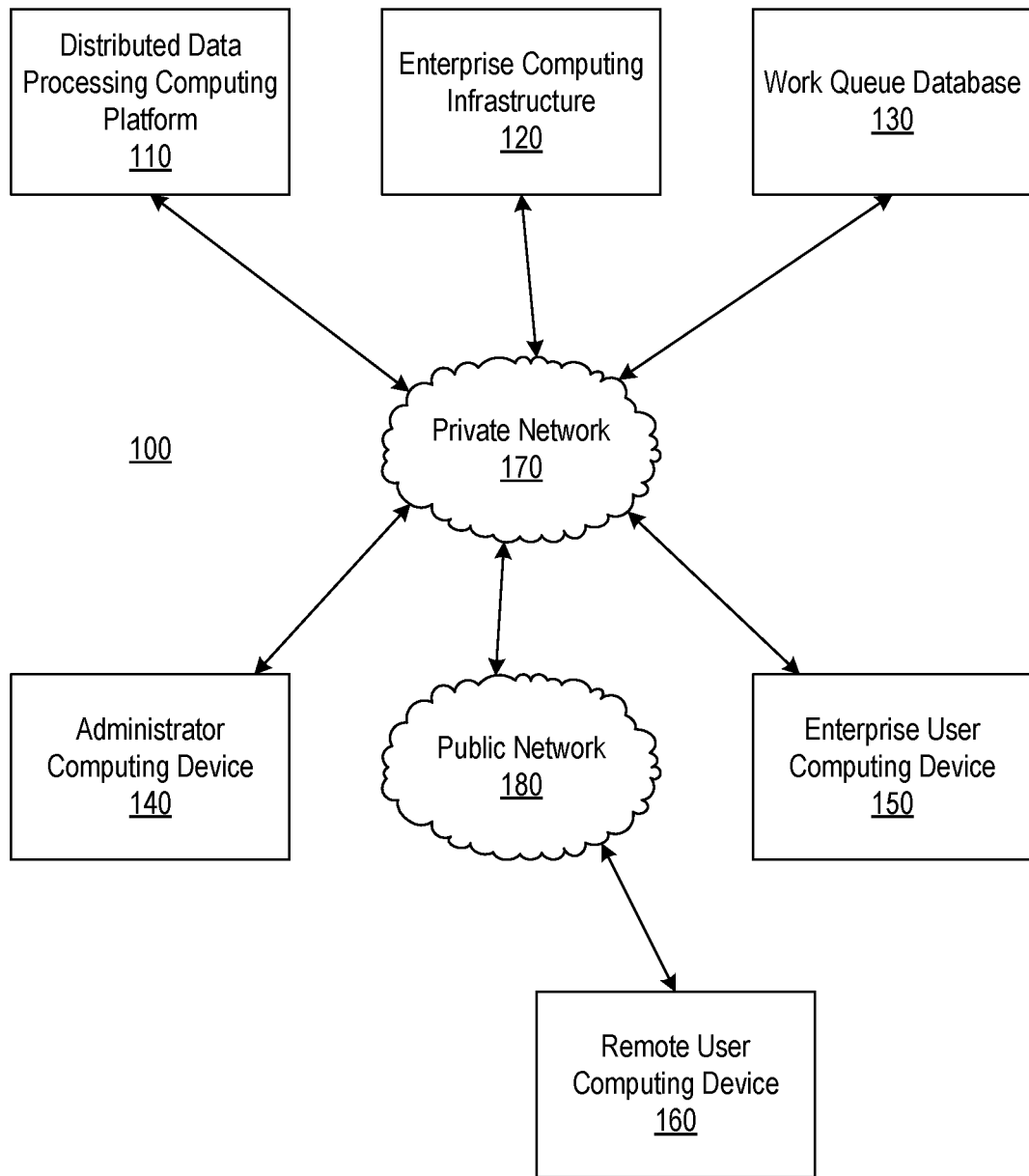
FIGS. 1A and 1B depict an illustrative computing environment for providing and maintaining efficient and effective processing of sets of work items in enterprise computing environments by optimizing distributed and parallelized batch data processing in accordance with one or more example embodiments.
Figure 1B:
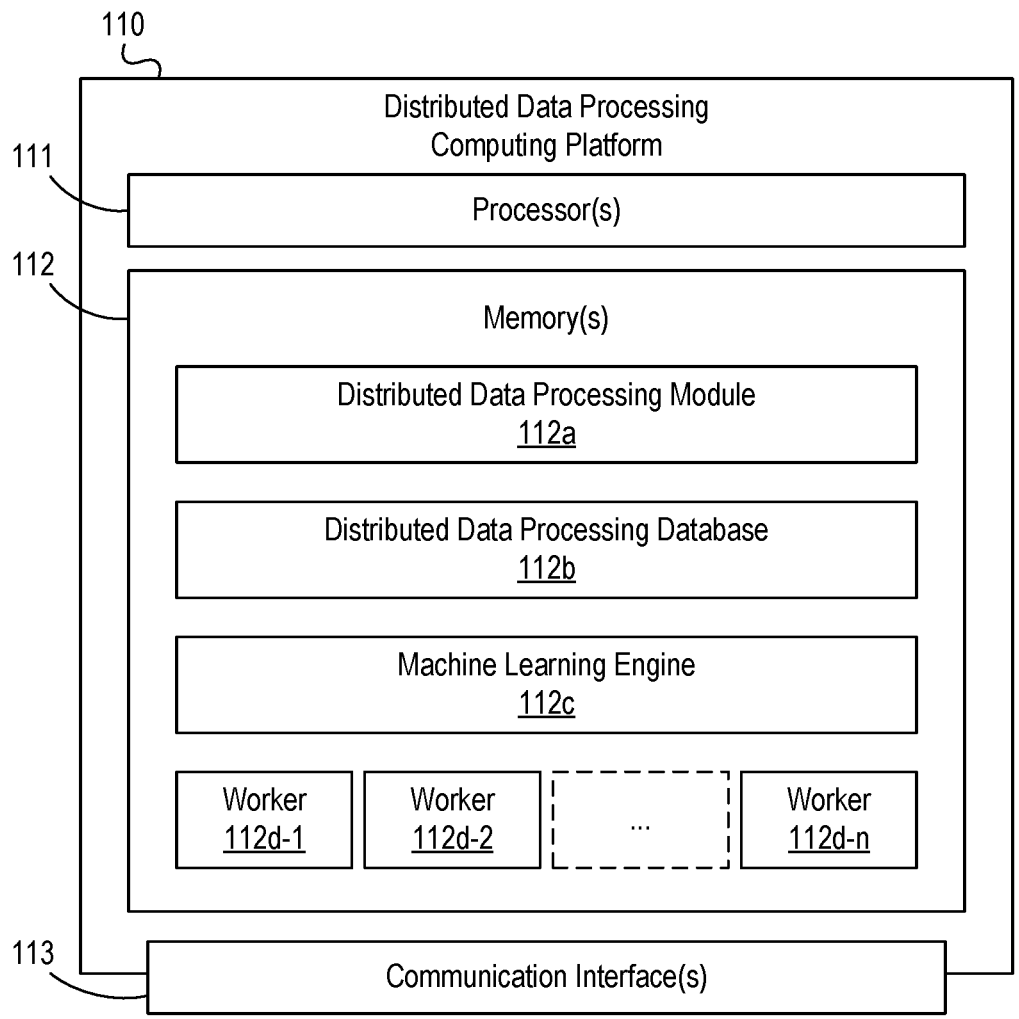

FIGS. 1A and 1B depict an illustrative computing environment for providing and maintaining efficient and effective processing of sets of work items in enterprise computing environments by optimizing distributed and parallelized batch data processing in accordance with one or more example embodiments. Referring to FIG. 1A, computing environment 100 may include one or more computer systems. For example, computing environment 100 may include a distributed data processing computing platform 110, enterprise computing infrastructure 120, a work queue database 130, an administrator computing device 140, an enterprise user computing device 150, and a remote user computing device 160.

As illustrated in greater detail below, distributed data processing computing platform 110 may include one or more computing devices configured to perform one or more of the functions described herein. For example, distributed data processing computing platform 110 may include one or more computers (e.g., laptop computers, desktop computers, servers, server blades, or the like).

Enterprise computing infrastructure 120 may include one or more computing devices and/or other computer components (e.g., processors, memories, communication interfaces). In addition, and as illustrated in greater detail below, enterprise computing infrastructure 120 may be configured to provide various enterprise and/or back-office computing functions for an organization, such as a financial institution. For example, enterprise computing infrastructure 120 may include various servers and/or databases that host, execute, and/or store various enterprise resources (e.g., enterprise applications, enterprise databases, enterprise information).

For instance, enterprise computing infrastructure 120 may include various servers and/or databases that store and/or otherwise maintain account information, such as financial account information including account balances, transaction history, account owner information, and/or other information. In addition, enterprise computing infrastructure 120 may host, execute, and/or store one or more enterprise applications that process and/or otherwise execute transactions on specific accounts based on commands and/or other information received from other computer systems included in computing environment 100. Additionally or alternatively, enterprise computing infrastructure 120 may load data from distributed data processing computing platform 110, manipulate and/or otherwise process such data, and return modified data and/or other data to distributed data processing computing platform 110 and/or to other computer systems included in computing environment 100.

Work queue database 130 may include one or more computing devices and/or other computer components (e.g., processors, memories, communication interfaces). In addition, and as illustrated in greater detail below, work queue database 130 may be configured to store information associated with various work items and/or other information. In some instances, such information may be organized into various data tables and/or sub-databases maintained by work queue database 130. Additionally, work queue database 130 may store and/or execute one or more database engines which may manage the information stored by work queue database 130, enable access to such information, and/or perform other functions.

Administrator computing device 140 may be a personal computing device (e.g., desktop computer, laptop computer) or mobile computing device (e.g., smartphone, tablet). In addition, administrator computing device 140 may be linked to and/or used by an administrative user (who may, e.g., be a network administrator of an organization operating distributed data processing computing platform 110).

Enterprise user computing device 150 may be a personal computing device (e.g., desktop computer, laptop computer) or mobile computing device (e.g., smartphone, tablet). In addition, enterprise user computing device 150 may be linked to and/or used by an enterprise user (who may, e.g., be an employee or other affiliate of an organization operating distributed data processing computing platform 110).

Remote user computing device 160 may be a personal computing device (e.g., desktop computer, laptop computer) or mobile computing device (e.g., smartphone, tablet). In addition, remote user computing device 160 may be linked to and/or used by a remote user (who may, e.g., be an employee or other affiliate of an organization operating distributed data processing computing platform 110 and who may be located outside of an enterprise network associated with the organization).

Computing environment 100 also may include one or more networks, which may interconnect one or more of distributed data processing computing platform 110, enterprise computing infrastructure 120, work queue database 130, administrator computing device 140, enterprise user computing device 150, and remote user computing device 160. For example, computing environment 100 may include a private network 170 (which may, e.g., interconnect distributed data processing computing platform 110, enterprise computing infrastructure 120, work queue database 130, administrator computing device 140, enterprise user computing device 150, and/or one or more other systems which may be associated with an organization, such as a financial institution) and public network 180 (which may, e.g., interconnect remote user computing device 160 with private network 170 and/or one or more other systems, public networks, sub-networks, and/or the like).

In one or more arrangements, work queue database 130, administrator computing device 140, enterprise user computing device 150, remote user computing device 160, and/or the other systems included in computing environment 100 may be any type of computing device capable of receiving a user interface, receiving input via the user interface, and communicating the received input to one or more other computing devices. For example, work queue database 130, administrator computing device 140, enterprise user computing device 150, remote user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of distributed data processing computing platform 110, enterprise computing infrastructure 120, work queue database 130, administrator computing device 140, enterprise user computing device 150, and remote user computing device 160 may, in some instances, be special-purpose computing devices configured to perform specific functions.

Referring to FIG. 1B, distributed data processing computing platform 110 may include one or more processor(s) 111, memory(s) 112, and communication interface(s) 113. A data bus may interconnect processor 111, memory 112, and communication interface 113. Communication interface 113 may be a network interface configured to support communication between distributed data processing computing platform 110 and one or more networks (e.g., network 170, network 180, or the like). Memory 112 may include one or more program modules and/or processing engines having instructions that when executed by processor 111 cause distributed data processing computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of distributed data processing computing platform 110 and/or by different computing devices that may form and/or otherwise make up distributed data processing computing platform 110. For example, memory 112 may have, store, and/or include a distributed data processing module 112a, a distributed data processing database 112b, a machine learning engine 112c, and a plurality of workers 112d-1, 112d-2, 112d-n.

Distributed data processing module 112a may have instructions that direct and/or cause distributed data processing computing platform 110 to optimize distributed and parallelized batch data processing, as discussed in greater detail below. Distributed data processing database 112b may store information used by distributed data processing module 112a and/or distributed data processing computing platform 110 in optimizing distributed and parallelized batch data processing. Machine learning engine 112c may perform and/or provide one or more machine learning and/or artificial intelligence functions and/or services, as illustrated in greater detail below. Each worker of the plurality of workers 112d-1, 112d-2, 112d-n may retrieve and process work items and/or perform other functions, as illustrated in greater detail below.

Figure 2A:
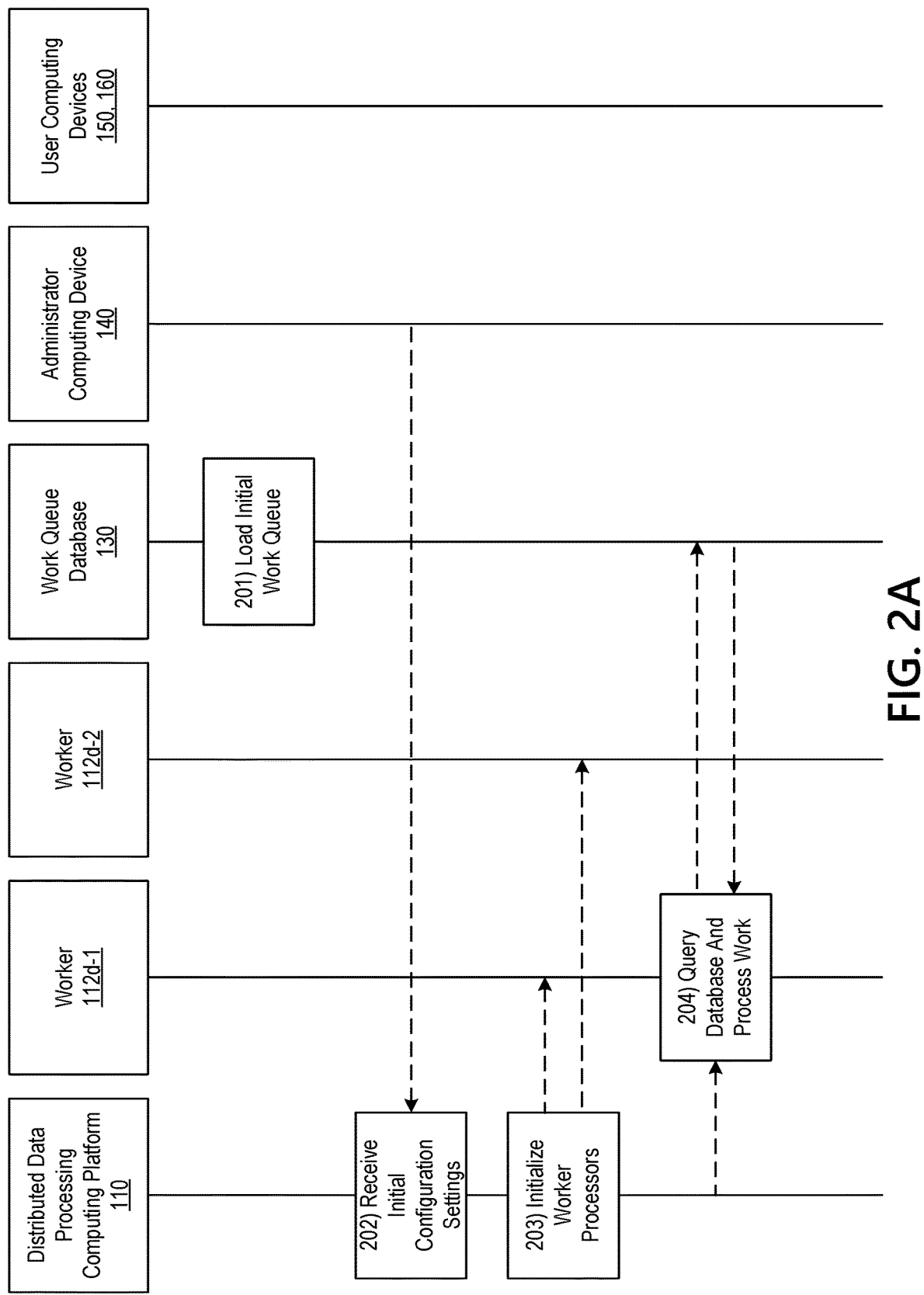
FIGS. 2A-2C depict an illustrative event sequence for providing and maintaining efficient and effective processing of sets of work items in enterprise computing environments by optimizing distributed and parallelized batch data processing in accordance with one or more example embodiments.
Figure 2B:
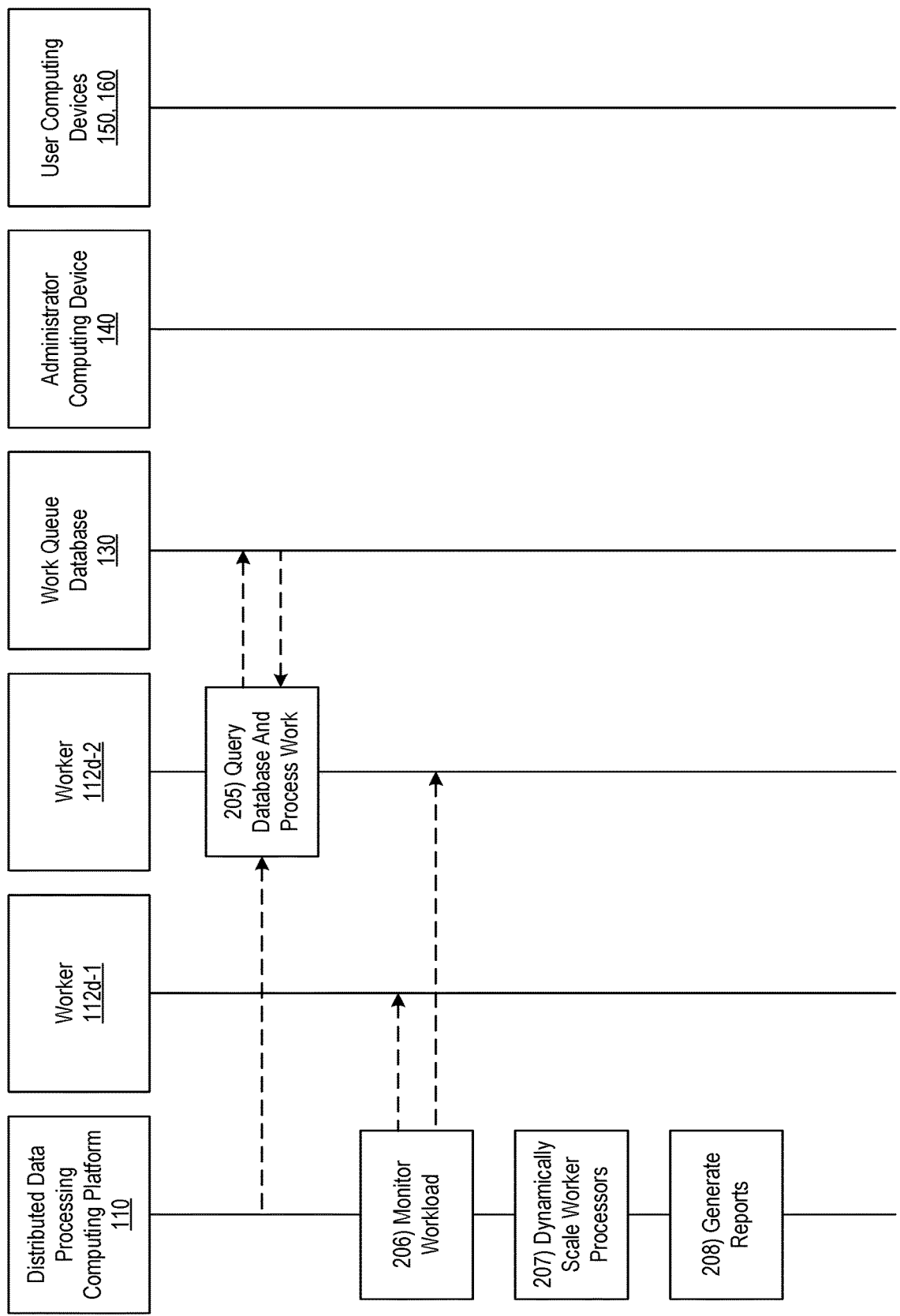
Figure 2C:
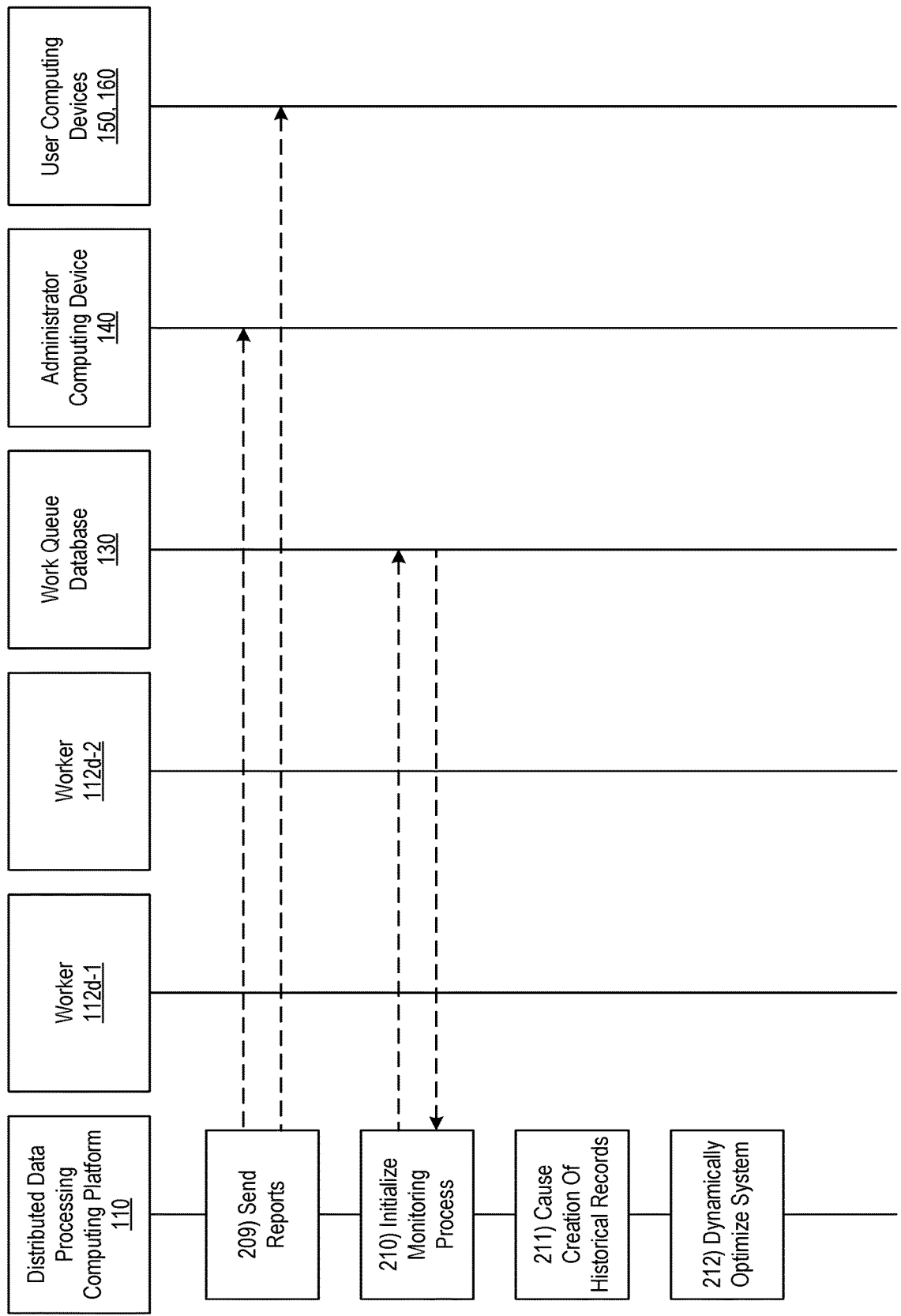

FIGS. 2A-2C depict an illustrative event sequence for providing and maintaining efficient and effective processing of sets of work items in enterprise computing environments by optimizing distributed and parallelized batch data processing in accordance with one or more example embodiments. Referring to FIG. 2A, at step 201, work queue database 130 may load an initial work queue. For instance, work queue database 130 may receive initial groups of work items from various other computing devices and/or systems (e.g., enterprise computing infrastructure 120, administrator computing device 140, enterprise user computing device 150, and/or remote user computing device 160), tag and/or otherwise process the work items, and/or load the work items into one or more data tables that may form the initial work queue. Each work item may, for instance, be a record in the database that instructs distributed data processing computing platform 110 or another computer system to do a specific piece or sequence of processing work. In some instances, a work item may include one or more commands to be executed (e.g., by distributed data processing computing platform 110 and/or one or more workers) and/or embedded data to be processed. In this way, work queue database 130 may maintain a current work queue that can be filled from other systems and/or devices and may operate as a task list that includes functions and/or processing work to be completed and/or assigned to different workers.

At step 202, distributed data processing computing platform 110 may receive initial configuration settings from administrator computing device 140. Such initial configuration settings may, for instance, define various parameters that can be used by different workers that may operate on distributed data processing computing platform 110. For instance, one or more of these initial configuration settings may define a configurable number of work items that each worker should request from work queue database 130 in a given instance.

At step 203, distributed data processing computing platform 110 may initialize one or more workers. For example, at step 203, distributed data processing computing platform 110 may initialize at least two processing workers, and initializing the at least two processing workers may include initializing a first processing worker (e.g., worker 112d-1) and a second processing worker (e.g., worker 112d-2).

At step 204, distributed data processing computing platform 110 may cause worker 112d-1 to query work queue database 130 and process work items. For example, at step 204, distributed data processing computing platform 110 may cause the first processing worker (e.g., worker 112d-1) to perform a first query on a work queue database (e.g., work queue database 130), where performing the first query on the work queue database includes reading and locking a first set of work items identified in the work queue database. For instance, worker 112d-1 may read and lock a first set of work items identified in the work queue database (e.g., work queue database 130) based on instructions and/or commands received from distributed data processing computing platform 110. In addition, distributed data processing computing platform 110 may cause the first processing worker (e.g., worker 112d-1) to initiate parallel processing of the first set of work items, where initiating parallel processing of the first set of work items includes: processing a first subset of the first set of work items in parallel; and upon completion of processing each work item of the first subset of the first set of work items, marking the corresponding work item as completed in the work queue database (e.g., work queue database 130). For instance, worker 112d-1 may process a first subset of the first set of work items in parallel, and upon completion of processing each work item of the first subset of the first set of work items, mark the corresponding work item as completed in the work queue database (e.g., work queue database 130) based on instructions and/or commands received from distributed data processing computing platform 110.

In marking the corresponding work item as completed in the work queue database (e.g., work queue database 130), worker 112d-1 may read data records that form or otherwise make up the work item, mark such data records as reserved, and/or write a timestamp to the database (or, e.g., cause such a timestamp to be recorded in the database or with a database engine associated with the database). Additionally or alternatively, in retrieving work items from the work queue database (e.g., work queue database 130), worker 112d-1 may take a configurable number of work items from a processing queue maintained in and/or associated with the work queue database (e.g., work queue database 130). For example, distributed data processing computing platform 110 and/or worker 112d-1 may be configured to read the queue associated with work queue database 130, grab and/or reserve twenty pieces of work (e.g., work items), and begin processing such work items. For instance, distributed data processing computing platform 110 and/or worker 112d-1 may be configured to process four items simultaneously in parallel (e.g., if the worker and/or the platform have sufficient bandwidth, at the time, to support parallel processing). After distributed data processing computing platform 110 and/or worker 112d-1 splits the retrieved work items and begins processing them in parallel, and at the conclusion of processing a given work item, distributed data processing computing platform 110 and/or worker 112d-1 may mark the corresponding data record as completed in the database (e.g., work queue database 130). For example, in processing the set of work items retrieved from the database, distributed data processing computing platform 110 and/or worker 112d-1 may write data to work queue database 130 and/or enterprise computing infrastructure 120. When distributed data processing computing platform 110 and/or worker 112d-1 completes processing that set of work items, distributed data processing computing platform 110 and/or worker 112d-1 may go back to the queue and request additional work items from work queue database 130. If there are no additional work items to process at that time, distributed data processing computing platform 110 and/or worker 112d-1 may periodically ping the queue and wait for more work items to be added to the queue.

In some embodiments, performing the first query on the work queue database may include causing a database engine associated with the work queue database to lock the first set of work items upon read. For example, in performing the first query on the work queue database (e.g., work queue database 130), distributed data processing computing platform 110 and/or worker 112d-1 may cause a database engine associated with the work queue database (e.g., work queue database 130) to lock the first set of work items upon read. By locking the first set of work items upon read, distributed data processing computing platform 110 and/or worker 112d-1 may ensure that other workers (e.g., worker 112d-2) do not grab the same work items as the first worker (e.g., worker 112d-1).

In some embodiments, performing the first query on the work queue database may include selecting the first set of work items based on one or more priority parameters. For example, in performing the first query on the work queue database (e.g., work queue database 130), distributed data processing computing platform 110 and/or worker 112d-1 may select the first set of work items based on one or more priority parameters. Such priority parameters may, for instance, specify that certain types of work items should be selected and/or processed before other types of work items. For instance, the priority parameters may specify that 'critical' items should be processed before 'high priority' items, which should be processed before 'medium priority' items, which should be processed before 'low priority' items.

In some embodiments, performing the first query on the work queue database may include writing, in the work queue database, a first timestamp indicating when the first set of work items were read from the work queue database. For example, in performing the first query on the work queue database (e.g., work queue database 130), distributed data processing computing platform 110 and/or worker 112d-1 may write, in the work queue database (e.g., work queue database 130), a first timestamp indicating when the first set of work items were read from the work queue database (e.g., 130). This timestamp may, for instance, enable tracking of processing times for various work items, which in turn may enable various metrics to be computed and/or captured as well as for expired work items to be passed to alternative workers for processing.

In some embodiments, the first timestamp may be tracked by a database engine associated with the work queue database to provide expired items to one or more other processing workers. For example, the first timestamp written by distributed data processing computing platform 110 and/or worker 112d-1 in the work queue database (e.g., work queue database 130) may be tracked by a database engine associated with the work queue database (e.g., work queue database 130) to provide expired items to one or more other processing workers. For instance, the database engine may determine that a given item is expired if a predetermined amount of time (e.g., five minutes) has elapsed since the timestamp was written (and, e.g., the work item was read and locked by a given worker) and the item has not been marked completed. In these instances, the database engine may operate on the assumption that if the item has not been marked completed by the worker that read and locked the item within the predetermined amount of time (e.g., five minutes), that the worker has failed and that the item will not be processed. Thus, in these instances, the database engine may unlock the item so that the item becomes available again for processing by one or more other workers (e.g., worker 112d-2). In particular, once the item is unlocked and available again, another processing worker (e.g., worker 112d-2) may read and lock the item (and subsequently processed the item) even though the item was previously read and locked by the first processing worker (e.g., worker 112d-1).

Referring to FIG. 2B, at step 205, distributed data processing computing platform 110 may cause worker 112d-2 to query work queue database 130 and process work items. For example, at step 205, distributed data processing computing platform 110 may cause the second processing worker (e.g., worker 112d-2) to perform a second query on the work queue database (e.g., work queue database 130), where performing the second query on the work queue database includes reading and locking a second set of work items identified in the work queue database. For instance, worker 112d-2 may read and lock a second set of work items identified in the work queue database (e.g., work queue database 130) based on instructions and/or commands received from distributed data processing computing platform 110. In addition, distributed data processing computing platform 110 may cause the second processing worker (e.g., worker 112d-2) to initiate parallel processing of the second set of work items, where initiating parallel processing of the second set of work items includes: processing a first subset of the second set of work items in parallel; and upon completion of processing each work item of the first subset of the second set of work items, marking the corresponding work item as completed in the work queue database (e.g., work queue database 130). For instance, worker 112d-2 may process a first subset of the second set of work items in parallel, and upon completion of processing each work item of the first subset of the second set of work items, mark the corresponding work item as completed in the work queue database (e.g., work queue database 130) based on instructions and/or commands received from distributed data processing computing platform 110.

In processing the work items and marking work items complete, worker 112d-2 may execute functions and/or perform steps similar to those described above with respect to worker 112d-1. For instance, worker 112d-2 may read data records that form or otherwise make up the work item, mark such data records as reserved, and/or write a timestamp to the database (or, e.g., cause such a timestamp to be recorded in the database or with a database engine associated with the database). Additionally or alternatively, in retrieving work items from the work queue database (e.g., work queue database 130), worker 112d-2 may take a configurable number of work items from the processing queue maintained in and/or associated with the work queue database (e.g., work queue database 130). For example, distributed data processing computing platform 110 and/or worker 112d-2 may be configured to read the queue associated with work queue database 130, grab and/or reserve twenty pieces of work (e.g., work items), and begin processing such work items. Worker 112d-2 may retrieve such work items by executing a command to 'select' the top N database records (e.g., the top 20 database records) 'where' such records are not locked. Because the database engine associated with work queue database 130 processes requests sequentially, this retrieval query will ensure that the second worker (e.g., worker 112d-2) does not get any of the non-expired records taken by the first worker (e.g., worker 112d-1) since each worker may command the database engine associated with work queue database 130 to lock records upon read. As a result, the second worker (e.g., worker 112d-2) might not even see the records that the first worker (e.g., worker 112d-1) is processing, because the first worker's records were locked and the database engine essentially makes those records invisible to the second worker.

Like the first worker (e.g., worker 112d-1), the second worker (e.g., worker 112d-2) may be configured to process four items simultaneously in parallel (e.g., if the worker and/or the platform have sufficient bandwidth, at the time, to support parallel processing). After distributed data processing computing platform 110 and/or worker 112d-2 splits the retrieved work items and begins processing them in parallel, and at the conclusion of processing a given work item, distributed data processing computing platform 110 and/or worker 112d-2 may mark the corresponding data record as completed in the database (e.g., work queue database 130). For example, in processing the set of work items retrieved from the database, distributed data processing computing platform 110 and/or worker 112d-2 may write data to work queue database 130 and/or enterprise computing infrastructure 120. When distributed data processing computing platform 110 and/or worker 112d-2 completes processing that set of work items, distributed data processing computing platform 110 and/or worker 112d-2 may go back to the queue and request additional work items from work queue database 130. If there are no additional work items to process at that time, distributed data processing computing platform 110 and/or worker 112d-2 may periodically ping the queue and wait for more work items to be added to the queue.

In some embodiments, performing the second query on the work queue database may include reading at least one work item that was read and locked by the first processing worker. For example, in performing the second query on the work queue database (e.g., work queue database 130) at step 205, distributed data processing computing platform 110 and/or worker 112d-2 may read at least one work item that was read and locked by the first processing worker (e.g., worker 112d-1). This may, for instance, occur because the timestamp(s) of the at least one work item has expired and the database engine associated with work queue database 130 is once again returning the at least one work item for processing. As introduced in examples discussed above, if work items are initially read and locked but not processed within a predetermined amount of time after being read and locked, these work items may then become available for processing by another worker. The 'locked' status of these work items is maintained by and expires with the database engine associated with work queue database 130, and so if a lock on some work items has expired when the second worker (e.g., worker 112d-2) queries the database, the database engine may allow those expired and now-unlocked work items to be read and locked by the second worker. In these instances, it may be assumed that the first worker (e.g., worker 112d-1) failed to process those work items is not going to be able to process them (e.g., because the worker failed or an error occurred from which the worker cannot recover). Additionally or alternatively, the first worker (e.g., worker 112d-1) may be configured such that if it comes back online and starts looking for work again, the first worker will go back to work queue database 130 and request new work items for processing. The risk of duplicative efforts thus may be greatly reduced, if not eliminated, since the second worker might only end up with work items initially taken by the first worker in instances where the first worker has most likely failed.

At step 206, distributed data processing computing platform 110 may monitor the workload of the various processing workers (e.g., worker 112d-1, worker 112d-2) and/or the work queue database (e.g., work queue database 130). For example, at step 206, distributed data processing computing platform 110 may monitor a pending workload in the work queue database (e.g., work queue database 130). This may, for instance, include querying work queue database 130, interrogating the database engine associated with work queue database 130, and/or interrogating one or more hardware host systems associated with work queue database 130.

In some embodiments, monitoring the pending workload in the work queue database may include requesting one or more size values from the work queue database. For example, in monitoring the pending workload in the work queue database (e.g., work queue database 130), distributed data processing computing platform 110 may request one or more size values from the work queue database (e.g., work queue database 130). For instance, distributed data processing computing platform 110 may query and/or retrieve size values indicating the size(s) of one or more tables, columns, rows, or the like associated with records that are waiting to be processed, without locking such records.

At step 207, distributed data processing computing platform 110 may dynamically scale one or more worker processors. For example, at step 207, based on monitoring the pending workload in the work queue database (e.g., work queue database 130), distributed data processing computing platform 110 may dynamically scale an availability level of processing workers (e.g., worker 112d-1, worker 112d-2, worker 112d-n). In some embodiments, dynamically scaling the availability level of processing workers may include initializing at least one additional processing worker. For example, in dynamically scaling the availability level of processing workers, distributed data processing computing platform 110 may initialize at least one additional processing worker. This may, for instance, include commanding and/or controlling a hypervisor to boot up a new virtual machine or other container that may host such a worker. In some embodiments, dynamically scaling the availability level of processing workers may include destroying at least one processing worker. For example, in dynamically scaling the availability level of processing workers, distributed data processing computing platform 110 may destroy at least one processing worker (e.g., by killing and/or otherwise deactivating one or more of worker 112d-1, worker 112d-2, worker 112d-n).

At step 208, distributed data processing computing platform 110 may generate one or more reports. Such reports may, for instance, include statistical information indicating how many worker items were processed in a given period of time by distributed data processing computing platform 110 and/or by individual workers, how many errors were encountered, how many items remain in work queue database 130, and/or other information. Distributed data processing computing platform 110 may send and/or otherwise provide such reports to one or more other systems and/or devices (e.g., administrator computing device 140, enterprise user computing device 150, remote user computing device 160), which may cause these other systems and/or devices to display such reports and/or interact with the information included in them.

Figure 3:
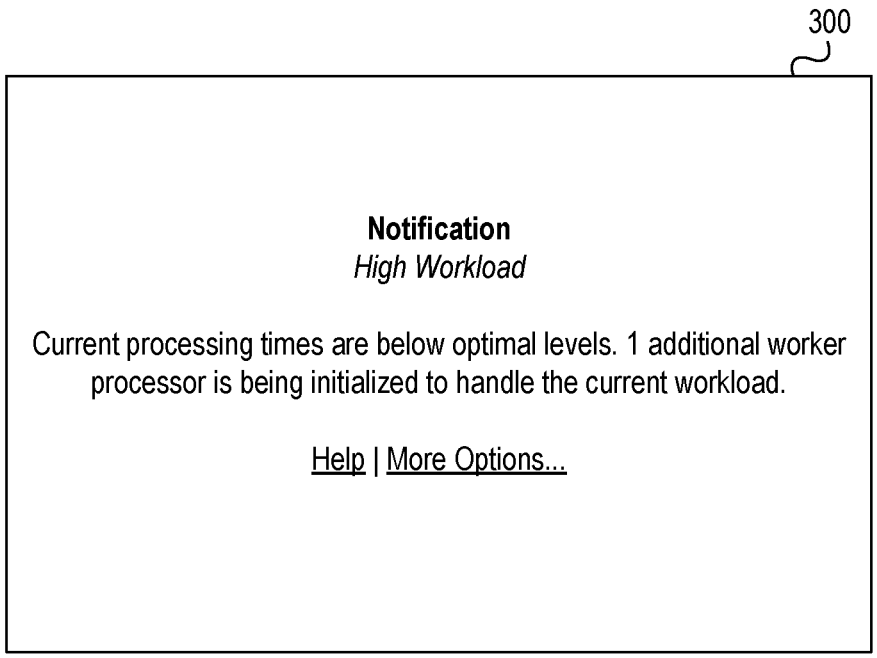
FIGS. 3 and 4 depict example graphical user interfaces for providing and maintaining efficient and effective processing of sets of work items in enterprise computing environments by optimizing distributed and parallelized batch data processing in accordance with one or more example embodiments.
Figure 4:
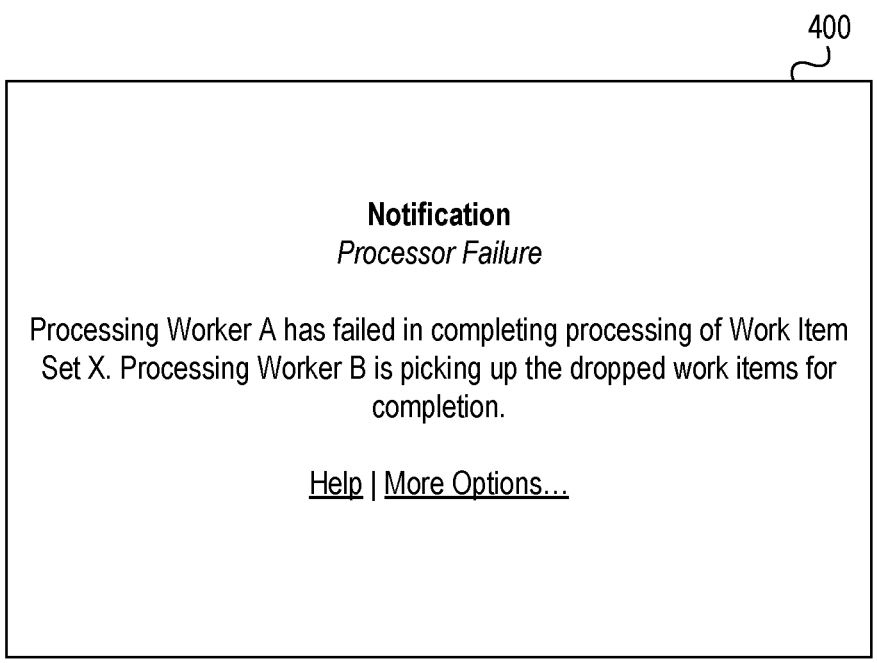

Referring to FIG. 2C, at step 209, distributed data processing computing platform 110 may send the reports to one or more other systems and/or devices (e.g., administrator computing device 140, enterprise user computing device 150, remote user computing device 160). In some instances, by sending the reports to one or more other systems and/or devices (e.g., administrator computing device 140, enterprise user computing device 150, remote user computing device 160), distributed data processing computing platform 110 may cause such systems and/or devices (e.g., administrator computing device 140, enterprise user computing device 150, remote user computing device 160) to generate, display, and/or otherwise present one or more graphical user interfaces that include information associated with work item processing. For instance, distributed data processing computing platform 110 may cause such systems and/or devices (e.g., administrator computing device 140, enterprise user computing device 150, remote user computing device 160) to generate, display, and/or otherwise present a graphical user interface similar to graphical user interface 300, which is illustrated in FIG. 3. As seen in FIG. 3, graphical user interface 300 may include text and/or other information indicating a high workload in the work queue database (e.g., "Current processing times are below optimal levels. 1 additional worker processor is being initialized to handle the current workload."). Additionally or alternatively, distributed data processing computing platform 110 may cause such systems and/or devices (e.g., administrator computing device 140, enterprise user computing device 150, remote user computing device 160) to generate, display, and/or otherwise present a graphical user interface similar to graphical user interface 400, which is illustrated in FIG. 4. As seen in FIG. 4, graphical user interface 400 may include text and/or other information indicating a processor failure (e.g., "Processing Worker A has failed in completing processing of Work Item Set X. Processing Worker B is picking up the dropped work items for completion.").

At step 210, distributed data processing computing platform 110 may initialize a monitoring process. For example, at step 210, distributed data processing computing platform 110 may initialize a monitoring process configured to monitor a pending workload in a work queue database (e.g., work queue database 130).

At step 211, distributed data processing computing platform 110 may cause the monitoring process to create records associated with the processing of work items in work queue database 130. For example, at step 211, distributed data processing computing platform 110 may cause a monitoring process to create one or more historical records. Such historical records may for instance, include information denoting current and/or prior data processing status of various work items. For example, distributed data processing computing platform 110 may cause the monitoring process to query the work queue database (e.g., work queue database 130) and create one or more historical records indicative of a workload processing status associated with one or more processing workers (e.g., worker 112d-1, worker 112d-2), where the one or more processing workers (e.g., worker 112d-1, worker 112d-2) are configured to process work items identified in the work queue database (e.g., work queue database 130) based on one or more processing parameters.

At step 212, distributed data processing computing platform 110 may dynamically optimize itself and/or one or more other systems. For example, at step 212, distributed data processing computing platform 110 may dynamically optimize one or more processing parameters based on the one or more historical records. For instance, distributed data processing computing platform 110 may adjust and/or otherwise optimize one or more processing parameters used by distributed data processing computing platform 110 and/or its associated workers (e.g., worker 112d-1, worker 112d-2, worker 112d-n) based on the one or more historical records created at step 211. In some instances, in dynamically optimizing the one or more processing parameters based on the one or more historical records, distributed data processing computing platform 110 may tune one or more processing parameters based on one or more machine learning models and/or algorithms. For example, distributed data processing computing platform 110 may use learning engine 112c to tune the configurable number of work items retrieved by each processing worker (e.g., worker 112d-1, worker 112d-2, worker 112d-n) based on the one or more historical records.

In some embodiments, after initializing the monitoring process and causing the monitoring process to query the work queue database and create one or more historical records and/or in dynamically optimizing the one or more processing parameters, distributed data processing computing platform 110 may identify one or more new parameter values for the one or more processing parameters associated with the one or more processing workers (e.g., worker 112d-1, worker 112d-2, worker 112d-n) based on the one or more historical records. For instance, distributed data processing computing platform 110 may identify such new parameter values (such as, e.g., the configurable number of work items, priority parameters, and/or other configuration parameters similar to those discussed in examples above) using learning engine 112c to process the one or more historical records.

Subsequently, distributed data processing computing platform 110 may configure the one or more processing workers (e.g., worker 112d-1, worker 112d-2, worker 112d-n) based on the one or more new parameter values identified for the one or more processing parameters associated with the one or more processing workers (e.g., worker 112d-1, worker 112d-2, worker 112d-n). For example, in configuring the one or more processing workers (e.g., worker 112d-1, worker 112d-2, worker 112d-n), distributed data processing computing platform 110 may launch new instances of processing workers based on the new parameter values, modify settings and/or otherwise reconfigure existing processing workers based on the new parameter values, and/or otherwise change operational features based on the new parameter values.

In some embodiments, each processing worker of the one or more processing workers may be configured to read a set of work items identified in the work queue database and process the set of work items in parallel. For example, each processing worker of the one or more processing workers (e.g., worker 112d-1, worker 112d-2, worker 112d-n) may be configured to read a set of work items identified in the work queue database (e.g., work queue database 130) and process the set of work items in parallel, as illustrated in the examples discussed above.

In some embodiments, each processing worker of the one or more processing workers may be configured to write a timestamp into the work queue database upon reading the set of work items, and the timestamp may indicate when the set of work items were read from the work queue database. For example, each processing worker of the one or more processing workers (e.g., worker 112d-1, worker 112d-2, worker 112d-n) may be configured to write a timestamp into the work queue database (e.g., work queue database 130) upon reading the set of work items, and the timestamp may indicate when the set of work items were read from the work queue database (e.g., work queue database 130), as illustrated in the examples discussed above.

In some embodiments, each processing worker of the one or more processing workers may be configured to lock the set of work items upon reading the set of work items. For example, each processing worker of the one or more processing workers (e.g., worker 112d-1, worker 112d-2, worker 112d-n) may be configured to lock the set of work items upon reading the set of work items, as illustrated in the examples discussed above.

In some embodiments, identifying the one or more new parameter values for the one or more processing parameters associated with the one or more processing workers may include: inputting, into at least one machine learning model, data selected from the one or more historical records; and receiving, from the machine learning model, the one or more new parameter values for the one or more processing parameters associated with the one or more processing workers. For example, in identifying the one or more new parameter values for the one or more processing parameters associated with the one or more processing workers (e.g., worker 112d-1, worker 112d-2, worker 112d-n), distributed data processing computing platform 110 may input, into at least one machine learning model (which may, e.g., be stored by and/or executed on machine learning engine 112c), data selected from the one or more historical records. Subsequently, distributed data processing computing platform 110 may receive, from the machine learning model, the one or more new parameter values for the one or more processing parameters associated with the one or more processing workers (e.g., worker 112d-1, worker 112d-2, worker 112d-n). For instance, in receiving the one or more new parameter values for the one or more processing parameters associated with the one or more processing workers (e.g., worker 112d-1, worker 112d-2, worker 112d-n) from the machine learning model, distributed data processing computing platform 110 may receive new values for the configurable number of work items reserved by each worker when requesting new work items from work queue database 130, the expiration time used by the database engine associated with work queue database 130 (which may, e.g., control how long the database engine may wait to release locked—but incomplete—work items to another worker), priority settings, and/or other settings.

In some embodiments, configuring the one or more processing workers may include adjusting a number of work items requested by each processing worker of the one or more processing workers. For example, in configuring the one or more processing workers (e.g., worker 112d-1, worker 112d-2, worker 112d-n), distributed data processing computing platform 110 may adjust a number of work items requested by each processing worker of the one or more processing workers (e.g., worker 112d-1, worker 112d-2, worker 112d-n). This may, for instance, modify the number of work items reserved by each worker when requesting new work items from work queue database 130.

In some embodiments, configuring the one or more processing workers may include adjusting one or more priority settings used by each processing worker of the one or more processing workers. For example, in configuring the one or more processing workers (e.g., worker 112d-1, worker 112d-2, worker 112d-n), distributed data processing computing platform 110 may adjust one or more priority settings used by each processing worker of the one or more processing workers (e.g., worker 112d-1, worker 112d-2, worker 112d-n). This may, for instance, modify settings that define higher priority work items for relatively earlier processing and lower priority items for relatively later processing.

In some embodiments, configuring the one or more processing workers may include adjusting one or more expiration time values of a database engine associated with the work queue database. For in configuring the one or more processing workers (e.g., worker 112d-1, worker 112d-2, worker 112d-n), distributed data processing computing platform 110 may adjust one or more expiration time values of a database engine associated with the work queue database (e.g., work queue database 130). For instance, distributed data processing computing platform 110 may modify expiration time value(s) of the database engine that responds to queries from the processing workers. This may, for instance, modify settings that control how long the database engine of work queue database 130 waits to release locked, incomplete work items to another worker for processing.

Figure 5:
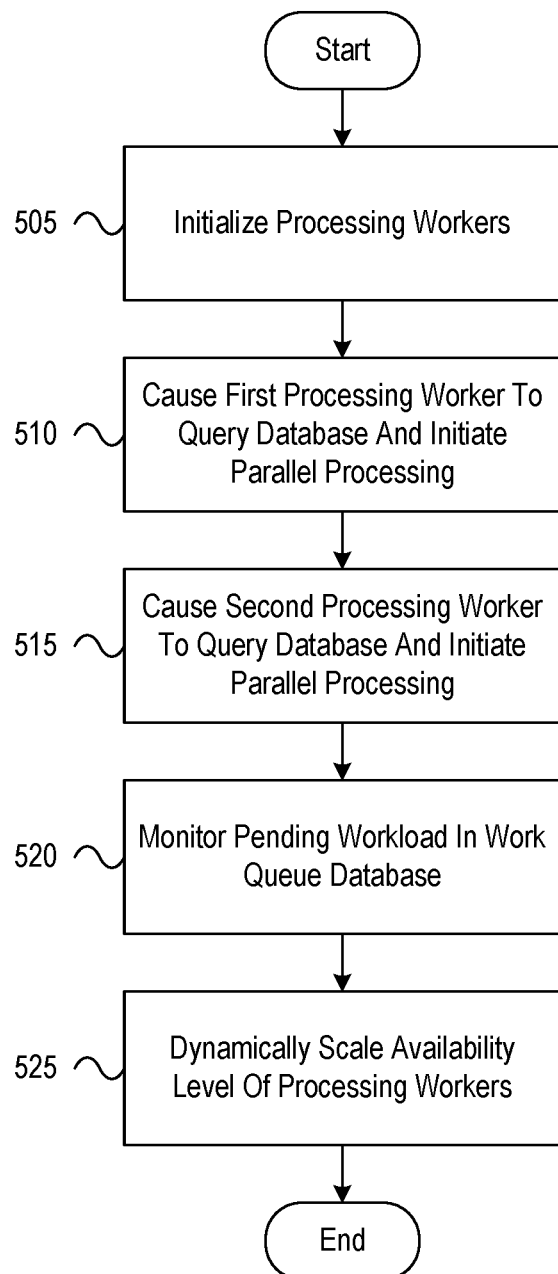
FIG. 5 depicts an illustrative method for providing and maintaining efficient and effective processing of sets of work items in enterprise computing environments by optimizing distributed and parallelized batch data processing in accordance with one or more example embodiments.

FIG. 5 depicts an illustrative method for providing and maintaining efficient and effective processing of sets of work items in enterprise computing environments by optimizing distributed and parallelized batch data processing in accordance with one or more example embodiments. Referring to FIG. 5, at step 505, a computing platform comprising at least one hardware processor, a communication interface, and memory may initialize at least two processing workers, and initializing the at least two processing workers may include initializing a first processing worker and a second processing worker. At step 510, the computing platform may cause the first processing worker to: perform a first query on a work queue database, where performing the first query on the work queue database includes reading and locking a first set of work items identified in the work queue database; and initiate parallel processing of the first set of work items, where initiating parallel processing of the first set of work items includes: processing a first subset of the first set of work items in parallel; and upon completion of processing each work item of the first subset of the first set of work items, marking the corresponding work item as completed in the work queue database.

At step 515, the computing platform may cause the second processing worker to: perform a second query on the work queue database, where performing the second query on the work queue database includes reading and locking a second set of work items identified in the work queue database; and initiate parallel processing of the second set of work items, where initiating parallel processing of the second set of work items includes: processing a first subset of the second set of work items in parallel; and upon completion of processing each work item of the first subset of the second set of work items, marking the corresponding work item as completed in the work queue database. At step 520, the computing platform may monitor a pending workload in the work queue database. At step 525, based on monitoring the pending workload in the work queue database, the computing platform may dynamically scale an availability level of processing workers.

Figure 6:
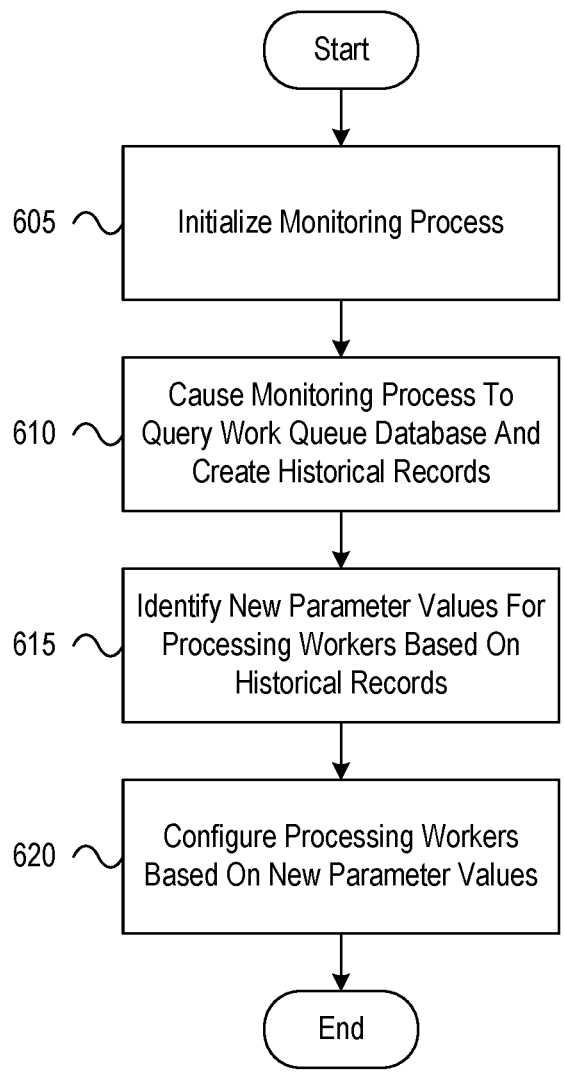
FIG. 6 depicts another illustrative method for providing and maintaining efficient and effective processing of sets of work items in enterprise computing environments by optimizing distributed and parallelized batch data processing in accordance with one or more example embodiments.

FIG. 6 depicts another illustrative method for providing and maintaining efficient and effective processing of sets of work items in enterprise computing environments by optimizing distributed and parallelized batch data processing in accordance with one or more example embodiments. Referring to FIG. 6, at step 605, a computing platform comprising at least one hardware processor, a communication interface, and memory may initialize a monitoring process configured to monitor a pending workload in a work queue database. At step 610, the computing platform may cause the monitoring process to query the work queue database and create one or more historical records indicative of a workload processing status associated with one or more processing workers, where the one or more processing workers may be configured to process work items identified in the work queue database based on one or more processing parameters. At step 615, the computing platform may identify one or more new parameter values for the one or more processing parameters associated with the one or more processing workers based on the one or more historical records. At step 620, the computing platform may configure the one or more processing workers based on the one or more new parameter values identified for the one or more processing parameters associated with the one or more processing workers.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one hardware processor;
   a communication interface communicatively coupled to the at least one hardware processor; and
   memory storing computer-readable instructions that, when executed by the at least one hardware processor, cause the computing platform to:
   initialize at least two processing workers, wherein initializing the at least two processing workers comprises initializing a first processing worker and a second processing worker;
   cause the first processing worker to:
   perform a first query on a work queue database, wherein performing the first query on the work queue database comprises reading and locking a first set of work items identified in the work queue database; and
   initiate parallel processing of the first set of work items, wherein initiating parallel processing of the first set of work items comprises:
   processing a first subset of the first set of work items in parallel; and
   upon completion of processing each work item of the first subset of the first set of work items, marking the corresponding work item as completed in the work queue database; and
   cause the second processing worker to:
   perform a second query on the work queue database, wherein performing the second query on the work queue database comprises reading and locking a second set of work items identified in the work queue database; and
   initiate parallel processing of the second set of work items, wherein initiating parallel processing of the second set of work items comprises:
   processing a first subset of the second set of work items in parallel; and
   upon completion of processing each work item of the first subset of the second set of work items, marking the corresponding work item as completed in the work queue database.

2. The computing platform of claim 1, wherein performing the first query on the work queue database comprises causing a database engine associated with the work queue database to lock the first set of work items upon read.

3. The computing platform of claim 1, wherein performing the first query on the work queue database comprises selecting the first set of work items based on one or more priority parameters.

4. The computing platform of claim 1, wherein performing the first query on the work queue database comprises writing, in the work queue database, a first timestamp indicating when the first set of work items were read from the work queue database.

5. The computing platform of claim 4, wherein the first timestamp is tracked by a database engine associated with the work queue database to provide expired items to one or more other processing workers.

6. The computing platform of claim 1, wherein performing the second query on the work queue database comprises reading at least one work item that was read and locked by the first processing worker.

7. The computing platform of claim 1, wherein the memory stores additional computer-readable instructions that, when executed by the at least one hardware processor, cause the computing platform to:
   monitor a pending workload in the work queue database; and
   based on monitoring the pending workload in the work queue database, dynamically scale an availability level of processing workers.

8. The computing platform of claim 7, wherein monitoring the pending workload in the work queue database comprises requesting one or more size values from the work queue database.

9. The computing platform of claim 7, wherein dynamically scaling the availability level of processing workers comprises initializing at least one additional processing worker.

10. The computing platform of claim 7, wherein dynamically scaling the availability level of processing workers comprises destroying at least one processing worker.

11. The computing platform of claim 1, wherein the memory stores additional computer-readable instructions that, when executed by the at least one hardware processor, cause the computing platform to:
cause a monitoring process to create one or more historical records; and
dynamically optimize one or more processing parameters based on the one or more historical records.

12. A method, comprising:
at a computing platform comprising at least one hardware processor, a communication interface, and memory:
initializing, by the at least one hardware processor, at least two processing workers, wherein initializing the at least two processing workers comprises initializing a first processing worker and a second processing worker;
causing, by the at least one hardware processor, the first processing worker to:
perform a first query on a work queue database, wherein performing the first query on the work queue database comprises reading and locking a first set of work items identified in the work queue database; and
initiate parallel processing of the first set of work items, wherein initiating parallel processing of the first set of work items comprises:
processing a first subset of the first set of work items in parallel; and
upon completion of processing each work item of the first subset of the first set of work items, marking the corresponding work item as completed in the work queue database; and
causing, by the at least one hardware processor, the second processing worker to:
perform a second query on the work queue database, wherein performing the second query on the work queue database comprises reading and locking a second set of work items identified in the work queue database; and
initiate parallel processing of the second set of work items, wherein initiating parallel processing of the second set of work items comprises:
processing a first subset of the second set of work items in parallel; and
upon completion of processing each work item of the first subset of the second set of work items, marking the corresponding work item as completed in the work queue database.

13. The method of claim 12, wherein performing the first query on the work queue database comprises causing a database engine associated with the work queue database to lock the first set of work items upon read.

14. The method of claim 12, wherein performing the first query on the work queue database comprises selecting the first set of work items based on one or more priority parameters.

15. The method of claim 12, wherein performing the first query on the work queue database comprises writing, in the work queue database, a first timestamp indicating when the first set of work items were read from the work queue database.

16. The method of claim 15, wherein the first timestamp is tracked by a database engine associated with the work queue database to provide expired items to one or more other processing workers.

17. The method of claim 12, wherein performing the second query on the work queue database comprises reading at least one work item that was read and locked by the first processing worker.

18. The method of claim 12, further comprising:
monitoring, by the at least one hardware processor, a pending workload in the work queue database; and
based on monitoring the pending workload in the work queue database, dynamically scaling, by the at least one hardware processor, an availability level of processing workers.

19. The method of claim 18, wherein monitoring the pending workload in the work queue database comprises requesting one or more size values from the work queue database.

20. One or more non-transitory computer-readable media storing instructions that, when executed by a computing platform comprising at least one hardware processor, a communication interface, and memory, cause the computing platform to:
initialize at least two processing workers, wherein initializing the at least two processing workers comprises initializing a first processing worker and a second processing worker;
cause the first processing worker to:
perform a first query on a work queue database, wherein performing the first query on the work queue database comprises reading and locking a first set of work items identified in the work queue database; and
initiate parallel processing of the first set of work items, wherein initiating parallel processing of the first set of work items comprises:
processing a first subset of the first set of work items in parallel; and
upon completion of processing each work item of the first subset of the first set of work items, marking the corresponding work item as completed in the work queue database; and
cause the second processing worker to:
perform a second query on the work queue database, wherein performing the second query on the work queue database comprises reading and locking a second set of work items identified in the work queue database; and
initiate parallel processing of the second set of work items, wherein initiating parallel processing of the second set of work items comprises:
processing a first subset of the second set of work items in parallel; and
upon completion of processing each work item of the first subset of the second set of work items, marking the corresponding work item as completed in the work queue database.

* * * * *